(12) United States Patent
Jogi et al.

(10) Patent No.: US 12,192,949 B2
(45) Date of Patent: Jan. 7, 2025

(54) EFFICIENT UWB RANGING

(71) Applicant: NXP B.V., Eindhoven (NL)

(72) Inventors: Sunil Dilipkumar Jogi, Bangalore (IN); Giten Kulkarni, Bangalore (IN)

(73) Assignee: NXP B.V., Eindhoven (NL)

( * ) Notice: Subject to any disclaimer, the term of this patent is extended or adjusted under 35 U.S.C. 154(b) by 360 days.

(21) Appl. No.: 17/656,083

(22) Filed: Mar. 23, 2022

(65) Prior Publication Data

US 2022/0346054 A1 Oct. 27, 2022

(30) Foreign Application Priority Data

Apr. 21, 2021 (IN) .............................. 202111018483

(51) Int. Cl.
*H04W 64/00* (2009.01)
*H04B 1/69* (2011.01)

(52) U.S. Cl.
CPC .............. *H04W 64/00* (2013.01); *H04B 1/69* (2013.01)

(58) Field of Classification Search
CPC ................................. H04W 64/00; H04B 1/69
See application file for complete search history.

(56) References Cited

U.S. PATENT DOCUMENTS

| | | | |
|---|---|---|---|
| 9,763,054 | B2 | 9/2017 | Kong et al. |
| 2017/0276480 | A1 | 9/2017 | Hedley et al. |
| 2020/0150262 | A1 | 5/2020 | Kim et al. |

FOREIGN PATENT DOCUMENTS

WO WO-2016148820 A1 * 9/2016 ........... G01S 13/765

OTHER PUBLICATIONS 802.15.4z-2020—IEEE Standard for Low-Rate Wireless Networks—vAmendment 1: Enhanced Ultra Wideband (UWB) Physical Layers (PHYs) and Associated Ranging Techniques; Aug. 25, 2020; DOI: 10.1109/IEEESTD.2020.9179124.
Pirch, Hans-Juergen et al.; FIRa Consortium; "Introduction to Impulse Radio UWB Seamless Access Systems"; Presented at the Fraunhofer SIT ID:Smart Workshop; Feb. 19-20, 2020, Darmstadt, Germany.

* cited by examiner

*Primary Examiner* — Ahmad F. Matar
*Assistant Examiner* — Jirapon Tulop

(57) ABSTRACT

There is disclosed devices and methods of operating a first device to determine a distance, between it and a further device, the methods comprising: transmitting a first broadcast frame comprising an identifier and a transmission timestamp; receiving a further broadcast frame, the further broadcast frame comprising an identifier of the further device, and a transmission timestamp of the further device, and at least one data pair comprising a transmitting device identifier and a reception timestamp, wherein the reception timestamp is indicative of the arrival time, at the further device, of a prior broadcast frame broadcast from the transmitting device; determining a reception timestamp of the further broadcast frame; comparing each transmitting device identifier with the identifier of the first device; and determining the distance between the first device and the further device.

17 Claims, 6 Drawing Sheets

| | Reception of BRM Frame | Transmission of BRM Frame |
|---|---|---|
| A | | BRM Frame TxA: (TTxA) → because nothing received, Clear calculated peer table. |
| B | BRM Frame Rx at B: (A, TRxAB) → Stored in the Received Frame Table. | |
| C | | BRM Frame TxB: (TTxB;A,TRxAB;) |
| D | BRM Frame from B, Rx at A: (B,TTxB;A,T0RxAB;) A → Store T0RxBA. .Calculate distance between A and B and add into table of calculated peer table in A | |
| E | | BRM Frame TxC: (TTxC;B,TRxBC;) |
| F | BRM Frame from C, Rx at B: (C,TTxC;B,TRxBC;) A → Store TRxCB Calculate distance between B and C add into table of calculated peer table in B | |
| G | | BRM Frame TxB: (B, T1RxB; A,T0RxAB;C,T0RxCB) → Clear calculated peer table. |
| H | BRM Frame from B, Rx at A (B, T1TxB;A, TRxAB ;C, TRxCB) → Store T1RxBA May Ignore because distance A-B already in calculated peer table and C not in A's radio range | |
| I | BRM Frame from B, Rx at C (B, T1TxB;A, TRxAB ;C, TRxCB) →Store Store T1RxBC Calculate distance between B and C add into table of calculated peer table in C. Ignore A as A is not in radio range of C | |
| J | | BRM Frame TxA: (T1TxA; B, T1RxBA) |
| K | BRM Frame from A Rx at B (A, T1TXA;B, T1RxBA) → Store T1RxAB Calculate distance between B and A and add into table of calculated peer B | |

*Fig. 9*

EFFICIENT UWB RANGING

CROSS-REFERENCE TO RELATED APPLICATIONS

This application claims priority under 35 U.S.C. § 119 to India Patent Application No. 202111018483, filed on Apr. 21, 2021, the contents of which are incorporated by reference herein.

FIELD

The present disclosure relates to methods and devices for determining the distance between two devices using Ultra-WideBand (UWB) ranging protocols.

BACKGROUND

Determining the distance between a pair of devices by means of Ultra-WideBand (UWB) ranging protocols, is of increasing interest for a wide variety of applications such as vehicle enabling and control, and numerous different types of access and payment processes. Standards have been developed to facilitate ranging between a single pair of devices, or ranging between multiple pairs of devices configured as a controller (or initiator) and two or more controlees (or responders). However, such protocols are not particularly well suited to so-called "mesh network" environments where each of the devices have equal priority.

FIG. 1 illustrates one type of a mesh network, having four devices A 110, B 120, C 130, and D 140, each of which has a respective measuring range 150. For peer-to-peer measurement techniques according to known protocols, separate two-way ranging rounds are required (A-B, B-C, B-D, and A-D). In this example, four separate pairs of ranging have to be implemented, and there is no single controller. (It will be appreciated that direct distance measured can be carried out between devices the pairs of devices A and B, A and D, B and D, and B and C, since device C can directly measure the distance from device B, but is out of range for distance measurement from either A or D.) Further, it is also required that each device uses a so-called "out of-band" communication channel, that is to say, a separate channel such as a WIFI channel or another radio channel, to indicate to the other channels their presence within radio range. It is apparent that, as the number of devices within mutual range of each other increases, the number of separate measuring sessions increases rapidly—if all devices are in range of each other the number of sessions could increase with the factorial of the number of devices, which quickly becomes unmanageable.

SUMMARY

According to a first aspect of the present disclosure, there is provided A method of operating a first device to determine a distance, d, between the first device and a further device, the method comprising: transmitting a first broadcast frame comprising an identifier of the first device, A, and a transmission timestamp; receiving a further broadcast frame from the further device, the further broadcast frame comprising an identifier of the further device, B, and a transmission timestamp of the further device, and at least one data pair, each data pair comprising a transmitting device identifier, Q, and a reception timestamp, wherein the reception timestamp is indicative of the arrival time at the further device of a prior broadcast frame broadcast from the transmitting device; determining a reception timestamp of the further broadcast frame; comparing each transmitting device identifier, Q, with the identifier of the first device, A; and, in response to matching a one of the at least one transmitting device identifiers with the identifier of the first device, determining the distance between the first device and the further device. Since both the first device's transmission frame, and the further device's transmission frame are broadcast frames, intended for any listener within range, this may provide for more efficient ranging than conventional UWB ranging in which the further device's transmission frame is intended for only the first device, and sent only as a response, in a time-slot which is pre-specified by the controller. It will be appreciated that this method differs from conventional methods, in that, according to the present disclosure, the further device's transmission is a broadcast which is not constrained to be in a specific time-slot: that is to say the first device does not operate as a conventional controller to allocate timeslots to one or more individual responders. Furthermore, no prior communication to establish which devices are within range (which prior communication is typically done through out-of-band means), is required.

In one or more embodiments, determining the distance between the first device and the further device comprises using the transmission timestamp, TTxA, the reception timestamp at the further device, TRxQB, the transmission timestamp of the further device, TTxB, and the reception timestamp of the further broadcast frame, TRxBA. Determining the distance, d, between the first device and the further device may be according to:

$$d = (½) * \{(TRxQB - TTxA) + (TRxBA - TTxB)\}$$

The method may further comprise storing the distance, d, between the device and the further device. The method may further comprise storing other calculated distances between the first device and other devices in addition to the further device. One or more embodiments include storing the identifier of the further device, B, the transmission timestamp of the further device, TTxB, and the reception timestamp of the further broadcast frame, TRxBA. This information may be used in later transmissions thus improving the efficiency of the ranging activity.

In embodiments, the first device and the further devices each comprises an ultra-wideband, UWB, transceiver. UWB transceivers are particularly convenient for undertaking such ranging activities.

In embodiments wherein the broadcast frame and further broadcast frame are each a broadcast ranging frame. A broadcast ranging frame is a communication from a UWB device intended for ranging measurements; in general the frame includes, in addition to the data pair or pairs as mentioned above, an identifier of the sender, which is typically, but not necessarily, a Media Access Code, MAC, address, along with a transmission timestamp identifying the time of transmission (according to the sender's clock). The timestamp may be in the form of a scrambled timestamp, also referred to as a secure timestamp, STS.

In embodiments, the method may include, at the end of a time interval after transmitting the first broadcast frame, transmitting a subsequent broadcast frame, wherein the subsequent broadcast frame comprises the identifier of the first device, A, and a transmission timestamp, T2TxA, and at least one data pair, each data pair comprising a transmitting device identifier, P, and a reception timestamp, wherein the reception timestamp records the arrival time, TRxPA at the first device of a broadcast frame previously broadcast from the transmitting device, and wherein the time interval has a duration between 0.5 and 1.5 times a broadcast interval. In other embodiments the time interval is between 0.9 times and 1.1 times a broadcast interval. Applying a degree of randomness between the broadcast from individual devices may be beneficial in avoiding or minimising interference between broadcasts. The broadcast interval may be specific to the first device such that the further devices and any other devices may have different broadcast intervals, or may be common to the first device and further devices. In other embodiments, the degree of randomness of the time interval, with respect to the broadcast interval, may have different values, and/or may vary between devices.

According to a second aspect of the present disclosure, there is provided a method of operating a second device to determine the distance between the second device and a first device, the method comprising: transmitting a first broadcast frame comprising an identifier of the second device, B, and a transmission timestamp, TTxB, and at least one data pair, each data pair comprising a transmitting device identifier, P, and a reception timestamp, wherein the reception timestamp records the arrival time, TRxPA at the second device of a broadcast frame previously broadcast from the transmitting device, wherein a one of the at least one data pair is an identifier of the first device, A, and an associated reception timestamp; receiving a further broadcast frame from the first device, the further broadcast frame comprising an identifier of the first device, A, and a transmission timestamp of the first device, TTxA, and at least one data pair, each data pair comprising a transmitting device identifier, Q, and a reception timestamp, wherein the reception timestamp records the arrival time, TRxQA at the further device of a broadcast from the transmitting device; determining a reception timestamp of the further broadcast frame, TRxBA; comparing each transmitting device identifier, Q, with the identifier, B, of the second device; and, in response to matching a one of the one or more transmitting device identifiers with the identifier of the second device, determining the distance between the second device and the first device.

The broadcast frames previously broadcast from the transmitting device may have been received by the second device during an initial listening period, ILP.

According to a further aspect of the present disclosure, there is provided a first device having a device identifier, A, and comprising: a clock-circuit configured to generate one or more time-stamps; an ultra-wideband (UWB) transceiver, configured to: transmit a first broadcast frame comprising the device identifier, A and a transmission timestamp, TTxA generated by the clock, and receive a further broadcast frame from a further device, B; and a processor configured to determine, from the further broadcast frame: an identifier of the further device, B, a transmission timestamp of the further device, TTxB, and at least one data pair, each data pair comprising a transmitting device identifier, Q, and a reception timestamp, wherein the reception timestamp records the arrival time, TRxQB, at the further device of a broadcast frame previously broadcast from the first device; wherein the processor is further configured to: determine a reception timestamp of the further broadcast frame, TRxBA; compare each transmitting device identifier, Q, with the identifier of the first device, A; and, in response to matching a one of the one or more transmitting device identifiers with the identifier of the first device, determine the distance between the first device and the further device. Such a device is suited to efficient peer-to-peer UWB ranging, since it is adapted to operate the methods discussed above.

In embodiments, the first device may comprise a memory configured to store, for at least a recording interval, a dataset associated with the received further broadcast, and comprising: the identifier of the further device, B; the transmission timestamp of the further device, TTxB, and the reception timestamp of the further broadcast frame. Enabling the memory to limit the storage to data received during just a recording interval may be useful in order to control the amount of memory required for the storage. It may in addition be useful to control or limit the number of data pair as required in the broadcast frame, since data pair is received prior to the recording interval may no longer be available. In particular they may correspond to other devices which are no longer within range of radio reception for ranging purposes.

In embodiments, the memory is configured to store the dataset for one of: a recording interval, and until a combination of the dataset and the one or more further corresponding datasets exceeds a recording size-limit. It may thereby be avoided that information relating to transitory devices, which come into range only for a brief period fill up the memory and/or slow down the processing, In embodiments, the memory is configured to store one or more further respective corresponding datasets associated with respective yet further broadcast frames from one or more yet further devices. The device identifier may be a MAC, address.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as another non-transient signal.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which

FIG. 9 is a copy of table 1 which shows an example of the storage of data pairs, along with the distance calculations, at various moments.

Figure 1:
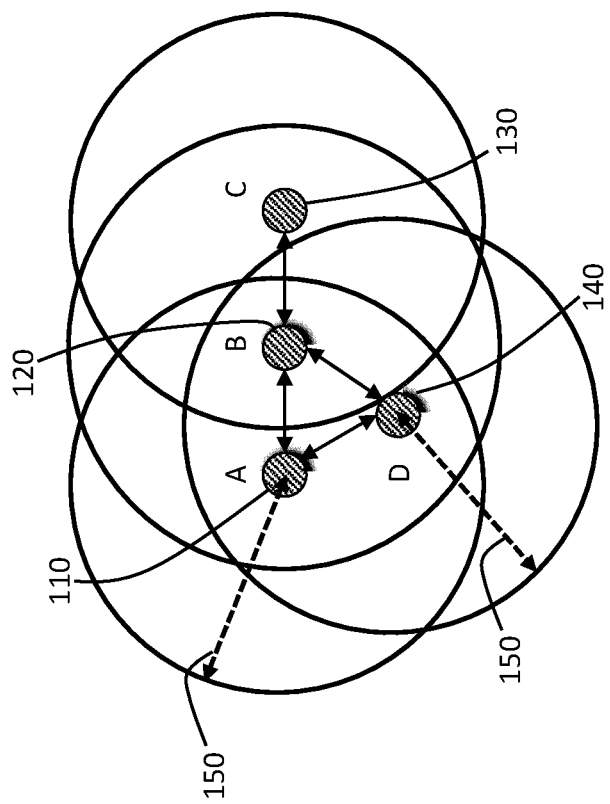
FIG. 1 illustrates one type of a mesh network.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

Figure 2:
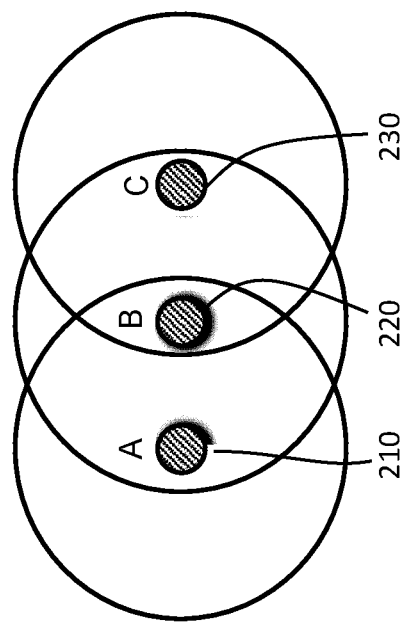
FIG. 2 illustrates a simple mesh network of 3 devices.

FIG. 2 illustrates a simple mesh network of 3 devices. In this example, which is arguably the most simple mesh network possible, first device A 210 and third device C 230 are each within range of a second device B 220, but not of each other. Thus each of devices A and C can determine the distance from B; conversely device B can determine its distance from each of device A and device C. According to conventional ranging techniques, two UWB pair-wise sessions (A-B, and B-C), would be required in this example, or a single session, with B as controller, and each of A and C as responders.

Figure 3:
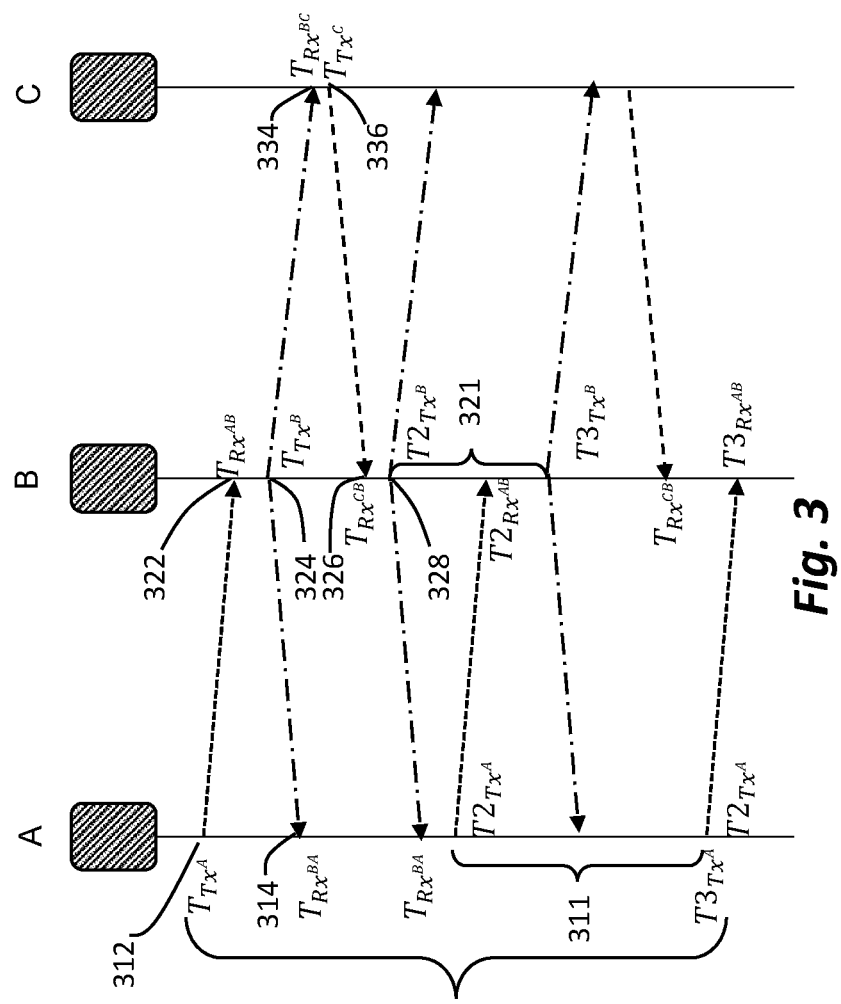
FIG. 3 shows a timing diagram for an efficient UWB ranging method according to one or more embodiments, for the network of FIG. 2.

FIG. 3 shows a timing diagram for an efficient UWB ranging method according to one or more embodiments of the present disclosure, which does not require a device to be a controller, and this will be described in comparison with a conventional ranging session in which the distance between devices A and B is determined. Shown are the transmissions and receptions to and from of each of the three devices A, B and C shown in FIG. 2.

In a conventional ranging session to determine the distance between A and B (with A as controller), initially the presence of devices in each other's radio range is informed via out-of-band means, such as Bluetooth, or Bluetooth Low Energy (BLE). After this the device which has controller role, that is to say, device A makes a first transmission TxA, at a moment TTxA, marked as 312. The transmission includes a timestamp of the moment of transmission, according to device A's clock. The transmission is received by device the at a later moment TRxAB shown at 322. Device B timestamps the receipt of the transmission from device A according to its (B's) clock. Soon after this, device B transmits a response TxB to device A, at moment TTxB (according to device B's clock) shown at 324. This response is received by device A at time TRxBA (according to device A's clock), at 314. Device A can now determine both the time of flight from A to B (i.e TRxAB−TTxA), and from B to A (i.e. TRxBA−TtxB). Although both of these individual time of flight calculations may include an error due to difference between the timing of the clocks in devices A and B, by combining the two measurements, the errors can be cancelled out, resulting in an accurate distance measurement. This will be referred to hereinunder as a "there-and-back" time of flight measurement: the first transmission (from A to B in this instance) may be termed the "outbound" transmission and the second transmission (from B to A in this instance) may be termed the "return" transmission. The skilled person will appreciate that the pair of "there-and-back" transmissions from and returning to A only provides "single-sided" ranging and a further transmission back to B from A is required to provide "double-sided" ranging.

According to embodiments of the present disclosure, the distance measurement between A and B is made in the same way, but the contents of the transmissions are adjusted, so as to enable re-use, or multi-use, of individual transmissions. In particular, instead of device B transmitting a response which is specific to device A, it transmits a "response" which can be used by one or more other devices.

This is illustrated in FIG. 3 at 334: the same transmission 324 from device B, is received by device C, as part of a distance measurement between B and C, and the receipt is timestamped by C, at moment TRxBC (according to C's clock). However, if this "response" were to be the conventional response for a "there-and-back" time of flight measurement between A and B, it could not be used by C (since it would contain only information specific to the A-to-B there-and-back measurement).

According to embodiments of the present disclosure, the transmission from B is different from a conventional response (back to A), in that it is formulated as a broadcast to all available receiving devices. It may thus act not only as the "return leg" in the measuring round between A and B, but could—potentially—be the return leg in a measuring round between C and B. To be of use as the "return" leg in multiple there-and-back measurements between device B and multiple other devices, it is configured to contain the required information from all available "outbound" legs. In this example, device B has not received an "outbound" transmission from C, so the transmission by B at moment 324 does not include any information regarding C.

Put another way, at this stage, there has been a transmission from A (received by B), and a transmission from B (received by A and C). There has thus been a round trip between A and B, which enables there-and-back time of flight measurements between A and B and thus (single-sided) ranging of B from A.

In order for ranging between B and C, a "return" leg from C to B is required. This is provided by the transmission 336 at moment TTxC, 336, which is received by device B at moment TRxCB 326. The pair of transmissions comprising an outbound leg from B (TTxB) and a "return" leg from C (TTxC) then can act as there-and-back time of flight measurement screen B and C, and thus implement a (single-sided) ranging of C from B.

Figure 6:
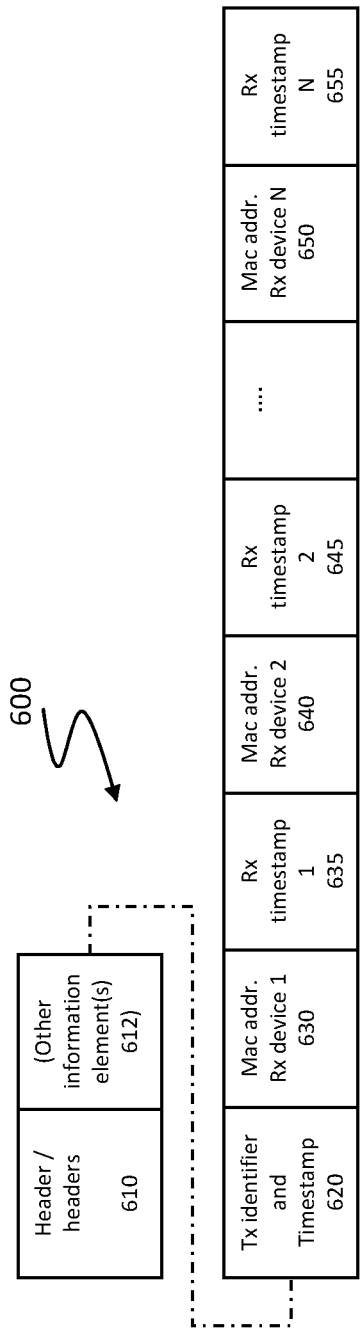
FIG. 6 illustrates the content of a broadcast frame according to embodiments.

As already mentioned in the case of the transmission by B at 324, in order for a single transmission to act as the "return" part or leg of multiple ranging measurements, it should be configured to contain the required information from multiple available "outbound" legs, and be "broadcast" to all the devices. This type of transmission may be described generically as a broadcast frame. Turning for the moment to FIG. 6, this illustrates the content of such a broadcast frame 600 according to embodiments of the present disclosure. For definiteness, let us assume that this is a transmission from device P. The frame 600 starts with header information 610, which may be followed by other information or information elements, at 612. The other information elements may include, for instance, application data, and/or received signal strength indicator (RSSI) Information. In addition, or alternatively, it may include information relating to (but not necessarily required for) the ranging session, such as the broadcast interval of the sending device, the number of subsequent entries or pairs in the frame (see below), and/or any already-calculated distances from other devices. The frame includes a timestamp of its transmission, Tx time 620. There then follows one or more pairs of data. In general, each data pair comprises a transmitting device identifier, Q, and a reception timestamp, wherein the reception timestamp is indicative of the arrival time, TRxQP, at the that device (Q) of a prior broadcast frame broadcast from the transmitting device. As shown in FIG. 6, the frame may comprise N pairs of data. Each pair of data includes, as the device identifier, the MAC address of a receiving device (Q) which has previously transmitted a broadcast signal to device P, along with the reception timestamp indicating when the previously transmitted broadcast signal from that device was received at device P. Thus, as shown, the frame may contain a first pair of data 630 and 635 comprising, respectively, "Mac addr. Rx device 1" and "Rx timestamp 1", a second pair of data 640 and 645 comprising, respectively, "Mac addr. Rx device 2" and "Rx timestamp 2", and so forth up to a final Nth pair of data, 650 and 655, comprising, respectively, "Mac addr. Rx device N" and "Rx timestamp N".

It will be appreciated, that there is a special case of the broadcast frame, corresponding to the situation where the transmitter has not received any previous broadcast from other devices. This is illustrated in FIG. 7, and corresponds to the situation in which N is equal to zero, the frame then comprises a header 710, along with a transmission timestamp 720, but no data pairs.

Figure 7:
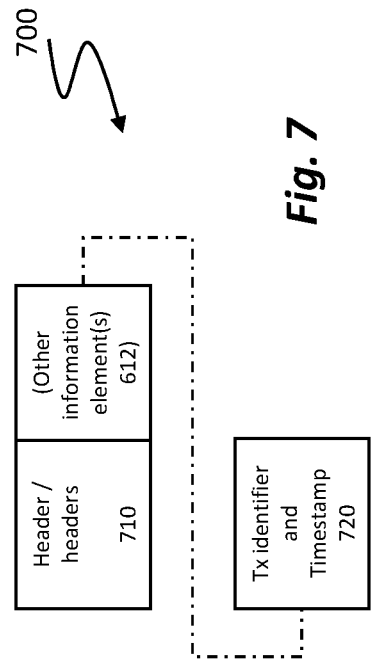
FIG. 7 illustrates the content of another, initial broadcast frame according to embodiments.

Applying this to embodiments such as that shown in FIG. 3, the broadcast frame TTxA from A at time 312 will have the format shown in FIG. 7; the broadcast frame TTXB from B at moment 324 will have the format shown in FIG. 6 in which N is equal to 1 and the single data pair is the MAC address and timestamp of the transmission received from A at moment TRxAB 322; and the broadcast frame TTXC from C at moments 336 will have the format shown in FIG. 6 in which N is equal to 1, the data pair being the MAC address and timestamp of the transmission received from B at moment TRxBC 334.

Subsequently, device B may transmit another broadcast frame T2TxB, at moment 328. Since device B has now received transmissions from both device C and device A, this broadcast frame T2TxB will have the format shown in FIG. 6 in which N is equal to 2, the first data pair being the MAC address and timestamp of the transmission received from A at moment TRxAB 322, and the second data pair being the MAC address and timestamp of the transmission received from C at moment TRxCB 326.

Embodiments of the present disclosure thus differ from conventional single-sided or double-sided ranging in that each device transmits a broadcast frame, which may be received and used by any other devices in range. For the purpose of this peer-to-peer ranging there is thus no identifiable "initiator" and "responder". Each device acts, to some extent, as an initiator since it broadcast a broadcast frame periodically rather than waiting to receive an external controller before responding. On the other hand, each device acts, to some extent, as a responder, since the broadcast frame it periodically broadcasts includes information about previously received broadcasts from other device, to the extent that it has such information available.

One potential problem which may arise is that of interference between the transmissions. In the absence of a single device acting as initiator or controller, there is the potential for broadcasts to interfere with each other in time. Whereas this may be addressed, as the skilled person will be familiar, in layers other than the physical layer, PHY, currently being considered, the problem may be overcome or resolved according to embodiments by a including dithering or randomisation to the intervals between broadcasts. As already mentioned, each device periodically broadcasts a broadcast frame. The interval between the broadcasts may be termed the "broadcast interval". The broadcast interval may be the same for all devices or may differ between devices. As already mentioned, transmissions from two devices may interfere and this would be of particular concern in the instance that the broadcast interval is the same for the two devices, since in that case, there would likely be interference between subsequent broadcasts from the pair of devices. The risk of this occurring may be reduced significantly by introducing a random delta to each device's broadcast interval, for instance if a device has a broadcast interval BI, the actual interval between broadcasts may be varied between, for example, 0.9*BI, and 1.1.*BI.

Figure 8:
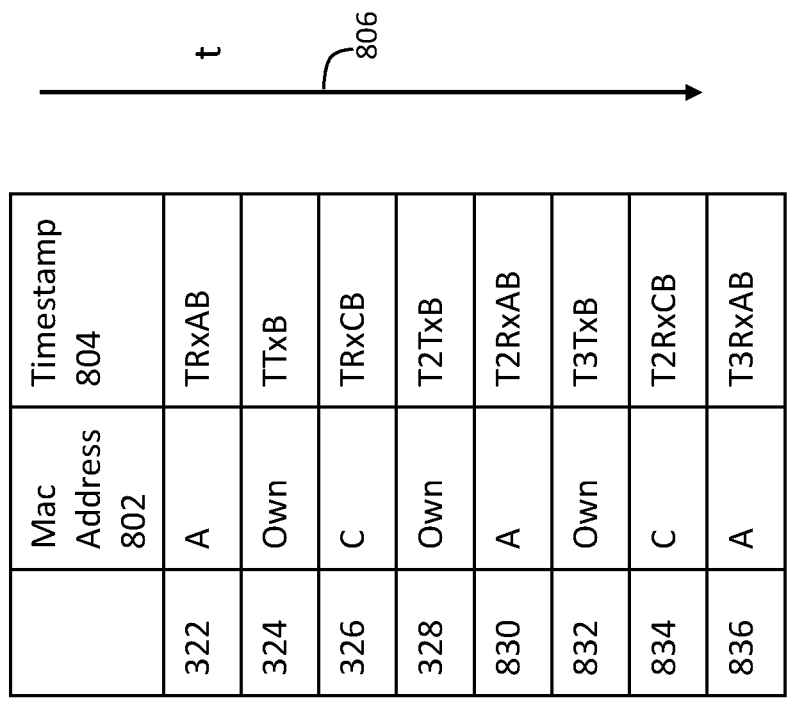
FIG. 8 illustrates transmissions and receptions from one of the devices shown in FIG. 3.

Turning now to FIG. 8, this illustrates the transmissions and receptions from one of the devices shown in FIG. 3 and specifically from a device B. Descending the table as time passes, the MAC address 802 of the transmitter of the broadcast frame (which is device B itself in the case of transmission of a frame, and one of your devices in the case of receipt of a frame), it is indicated along with the associated timestamp 804 each of events listed last device the first receives a broadcast frame from device A at 322 and timestamped as TRxAB, next it transmits from itself, at 324 the transmission timestamp at TTxB, next it receives a broadcast frame from device C at 326 and timestamps the reception at TRxCB, after which, it again transmits at 328 at timestamp T2TxB. At 830 its again receives a broadcast frame from A, timestamping the receipt at T2RxAB, following which it transmits, at 832 a transmission, timestamping that transmission at T3TxB. Finally, at 834 and 836, it receives broadcast frames from C and A respectively, time stamping the receptions at T2RxCB and T3RxAB respectively.

In order for a device to calculate its distance from any other device, it needs to know four pieces of information, in relation to that device: specifically, the send and receipt timestamps of an outbound transmission, along with the send and receipt timestamps of the return transmission. Each device, stores information corresponding to its own transmissions, and information received in the frames it receives which are broadcast from other devices, alongside the identifier of that other device and the timestamp of reception. An example of the storage of data pairs, along with the distance calculations, is shown below in Table 1, and copied as FIG. 9. It should be noted that the format of arrangement of the storage is not significant. For example, one way of implementation is to use a single table or data store for all data. Alternatively, and without limitation, the data storage could be organized in different ways, such as being split into multiple tables, etc.

TABLE 1 storage activities based on transmission and receipt of broadcast (BRM) frames.

| # | Reception of BRM Frame | Transmission of BRM Frame |
|---|---|---|
| A |  | BRM Frame TxA: $(T0_{Tx}^A) \rightarrow$ because nothing received Clear calculated peer table. |
| B | BRM Frame Rx at B: $(A, T0_{Rx}^{AB}) \rightarrow$ Stored in the Received Frame Table. |  |

TABLE 1-continued storage activities based on transmission and receipt of broadcast (BRM) frames.

| # | Reception of BRM Frame | Transmission of BRM Frame |
|---|---|---|
|   |   | BRM Frame TxB: $(T0_{Tx}^B; A, T0_{Rx}^{AB};)$ |
| C | BRM Frame from B, Rx at A: $(B, T0_{Tx}^B; A, T0_{Rx}^{AB};)$ A → Store $T0_{Rx}^{BA}$. Calculate distance between A and B and add into table of calculated peer table in A |   |
| D |   | BRM Frame TxC: $(T0_{Tx}^C; B, T0_{Rx}^{BC};)$ |
| E | BRM Frame from C, Rx at B: $(C, T0_{Tx}^C; B, T0_{Rx}^{BC};)$ A → Store $T0_{Rx}^{CB}$ Calculate distance between B and C add into table of calculated peer table in B |   |
| F |   | BRM Frame TxB: $(B, T1_{Rx}^B; A, T0_{Rx}^{AB}; C, T0_{Rx}^{CB})$ → Clear calculated peer table. |
| G | BRM Frame from B, Rx at A $(B, T1_{Tx}^B; A, T0_{Rx}^{AB}; C, T0_{Rx}^{CB})$ → Store Store $T1_{Rx}^{BA}$ May Ignore because distance A-B already in calculated peer table and C not in A's radio range |   |
| H | BRM Frame from B, Rx at C $(B, T1_{Tx}^B; A, T0_{Rx}^{AB}; C, T0_{Rx}^{CB})$ → Store $T1_{Rx}^{BC}$ Calculate distance between B and C add into table of calculated peer table in C. Ignore A as A is not in radio range of C |   |
| I |   | BRM Frame TxA: $(T1_{Tx}^A; B, T1_{Rx}^{BA})$ |
| J | BRM Frame from A Rx at B $(A, T1_{Tx}^A; B, T1_{Rx}^{BA})$ → Store $T1_{Rx}^{AB}$ Calculate distance between B and A and add into table of calculated peer B |   |

As indicated in table 1, once a device has access to the four timestamps mentioned above in relation to an upper device, it is able to calculate the distance from that other device. Thus, according to embodiments of the present invention, the device performs as calculation the distance from the other device is stored in a distance table. When it has available a further set of the four timestamps in relation to this other device, the distance table entry regarding that other device may be overwritten, in order to keep the information current; alternatively, it may ignore the further dataset, as indicated in row H of table 1 and FIG. 9, in order to minimise the processor loading.

A further aspect which requires consideration is that of how much data to store and specifically for how long to retain information about received broadcasts from other devices. For this, a further parameter may be introduced, which may be labelled the recording limit. The recording limit may refer a length of time, in which case it may alternatively be called a "recording interval", or it may refer to an amount of data, in which case it may alternatively be referred to as a recording size-limit. Alternatively, a combination of the two (i.e. a combination of a recording duration, and a recording size-limit, may be used. The recording limit may be the same for each device, or may differ between devices. In general, in the case of a recording interval, it will not be shorter than the broadcast interval for that device, and typically will be longer, in order to allow for the potential variability in the broadcast interval between devices. Each device records its own transmissions along with the corresponding timestamp of transmission, and receipt of broadcasts from other devices along with the one of the data pairs therein which refers to itself, if that is present. If it is present, that data pair includes the reception timestamp of the "outbound" transmission. Using that information, the transmission timestamp of that received broadcast, and the device's own timestamp of the receipt of that received broadcast, it can then calculate the distance, as mentioned above, between itself and the other device. At or after this time, the stored data relating to the other device may be deleted in order to ensure that the amount of stored data is manageable.

It may be the case that one or more devices come within range only briefly. Such a temporary or transitory device may transmit a broadcast frame, the data from which is stored by the device under discussion. The device under discussion will then include the corresponding data pair (MAC address and receipt timestamp) for the transitory device, in its own broadcast frames, even though the transitory device may have moved out of range. It may thus be necessary to be able to periodically purge the device's storage of data stored with regard to any "old" or transitory devices. A convenient way to do so is to set a recording interval as mentioned above. The device's memory may then only retain information for a single recording interval. As time passes, information from transitory devices, which has become redundant, will no longer be available.

In some embodiments, each device may have a typical default value preconfigured for one or both of the broadcast interval BI and the recording interval. One or both of these parameters may be configurable by the application or service running on top of the protocol. Or it could be provided to the application via an out of band service (such as over BLE or Wi-Fi) when the device enters a service area. In the event that there is no configuration from the application paying the preconfigured or default values may be used. In one or more other applications, the device may be configured to adapt the recording interval, or the recording size-limit, on the fly, based on an actual or expected number devices or a largest broadcast interval observed in the environment. This may allow optimisation of the stored information buffer and refresh rate.

As has already been mentioned, the configuration of devices shown in FIG. 2, is also suitable for conventional ranging protocols based on device B acting as controller or initiator and devices A and C each acting as controlees or responders. In such simple meshes, which may also be considered as star networks, embodiments of the present disclosure provide an alternative which may yield a performance enhancement. However, in other true mesh networks, protocols using a single initiator and multiple responders, do not allow to measure all of the required distances.

Figure 5:
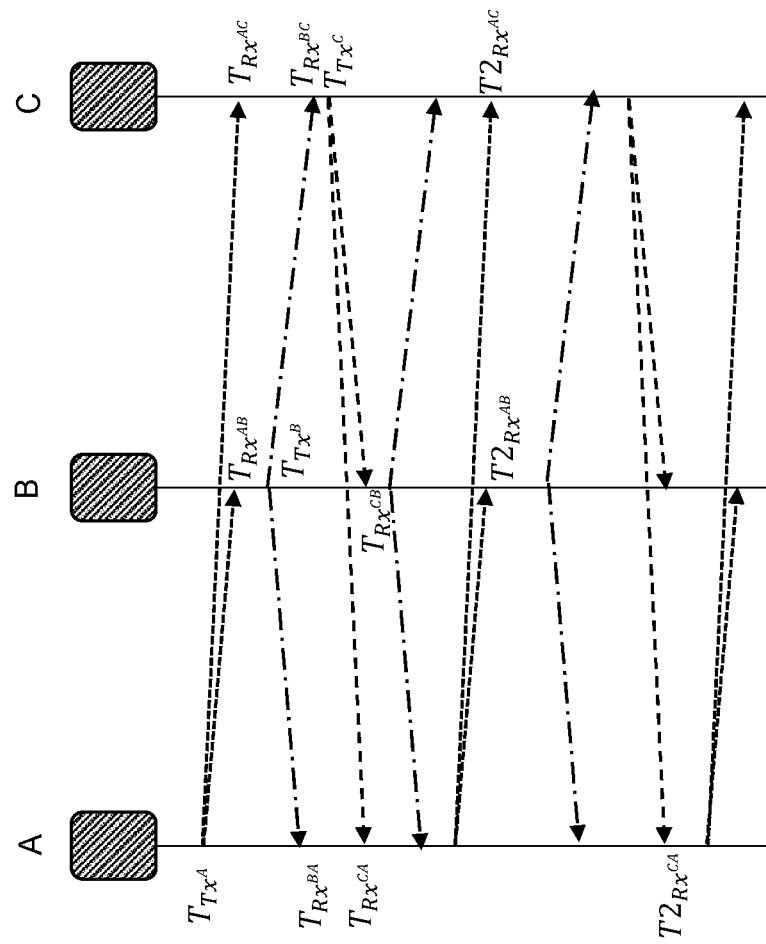
FIG. 5 shows a timing diagram for an efficient UWB ranging method according to one or more embodiments for the network of FIG. 4.
Figure 4:
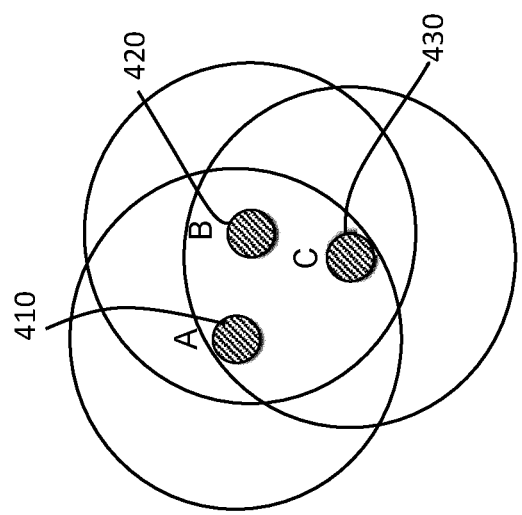
FIG. 4 illustrates another mesh network of 3 devices.

A simple such mesh network is illustrated in FIG. 4. FIG. 4 shows an arrangement of three devices A 410, B 420 and C 430, similar to FIG. 2, except that in this instance, device is within range of each other device. The corresponding timing diagram of transmission and reception is shown in FIG. 5. This is, again, broadly similar to that shown in FIG. 3 except that in this instance, the broadcast frames from device a are shown as be receiving received not only a device be (at moment TRxAB, T2RxAB) but also at device C (at TRxAC, T2RxAC etc.). Methods according to this arrangement are similar to those described with respect to FIG. 3, although in this case, it is not just device B that may include more than one data pair in its broad: in this embodiment devices A and B may include zero, one or two data pairs in their broadcast frames. For example, similar to the methods discussed with respect to FIG. 3, the first broadcast from device A (at TTxA) does not include any data pair, since it has not received any broadcasts from the other devices. Conversely, as can be seen from FIG. 5, device C receives a broadcast from each of device A and device B prior to sending its first broadcast. It's first broadcast at moment TTxC, will thus include not only a first data pair identifying device B and the timestamp TTxBC (as was the case in FIG. 3), but also a second data pair identifying device A and the timestamp TTxAC. Since each of device a and B have sent a prior transmission to device C, on receipt of this first broadcast from C, each of A and B can determine their distance from C.

As shown in both FIGS. 3 and 5, the process disclosed herein may start, with respect to any individual device, by that device transmitting its first broadcast frame, as illustrated in FIG. 7, with no data pairs associated. Each device may determine when to start the ranging process some predetermined criteria, such as upon identifying, either by UWB or by some other and means such as BLE or Wi-Fi it has or is entering a service area in which peer-to-peer ranging it is desirable or required. It may then immediately broadcast its first frame. Alternatively, it may wait for a period which we may designate as an initial listen period (ILP), which may be preconfigured or determined by the application or on-the-fly. Use of an ILP may allow the device to receive one or more transmissions from other devices already within the service area or running the application, and determine associated data pairs. The first transmission from the device under consideration may then be "preloaded" with one or more such data pairs, as illustrated in FIG. 6. This may improve the efficiency of the process as a whole.

From reading the present disclosure, other variations and modifications will be apparent to the skilled person. Such variations and modifications may involve equivalent and other features which are already known in the art of UWB ranging, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

We claim:

1. A method of operating a first device to determine a distance, d, between the first device and a further device, the method comprising:
transmitting, by the first device, a first broadcast frame, TxA, comprising an identifier of the first device, A, and a first transmission timestamp, TTxA, which indicates a first time of departure that corresponds to a first moment when the first device transmitted the first broadcast frame;
receiving, by the first device, a further broadcast frame, TxB, from the further device, the further broadcast frame including
a first data pair, which includes the identifier of the first device, A, and a first reception timestamp, TRxAB, which indicates a first time of arrival that corresponds to a second moment when the further device received the first broadcast frame,
an identifier of the further device, B, and a second transmission timestamp, TTxB, which indicates a second time of departure that corresponds to a third moment when the further device transmitted the further broadcast frame,
and a second data pair, which includes an identifier of another further device, C, and a second reception timestamp, TRxCB, which indicates a second time of arrival that corresponds to a fourth moment when the further device received another further broadcast frame;
determining, by the first device, a third reception timestamp, TRxBA, of the further broadcast frame that indicates a third time of arrival that corresponds to a fifth moment when the first device received the further broadcast frame;
and, in response to determining, by the first device, that the first data pair includes the identifier of the first device, determining the distance between the first device and the further device.

2. The method of claim 1, wherein determining the distance between the first device and the further device comprises using:
the first transmission timestamp, TTxA, the first reception timestamp at the further device, TRxAB, the second transmission timestamp of the further device, TTxB, and the third reception timestamp of the further broadcast frame, TRxBA.

3. The method of claim 2, further comprising determining the distance, d, between the first device and the further device according to:

$$d=(½)*\{(TRxAB-TTxA)+(TRxBA-TTxB)\}.$$

4. The method of claim 2, further comprising storing the identifier of the further device, B, the second transmission timestamp of the further device, TTxB, and the third reception timestamp of the further broadcast frame, TRxBA.

5. The method of claim 1, further comprising storing the distance, d.

6. The method of claim 1, wherein the first device and the further devices each comprises an ultra-wideband, UWB, transceiver.

7. The method of claim 1, wherein the broadcast frame and further broadcast frame are each a broadcast ranging frame.

8. The method of claim 1, further comprising:
storing, in a memory of the first device, a dataset associated with the further broadcast frame, TxB, and wherein the dataset includes
the identifier of the further device, B;
the second transmission timestamp of the further device, TTxB, and
the third reception timestamp, TRxBA, of the further broadcast frame.

9. The method of claim 8, further comprising storing, in the memory, one or more further respective corresponding datasets associated with respective yet further broadcast frames from one or more yet further devices.

10. The method of claim 9, comprising storing the dataset in the memory for a recording interval.

11. The method of claim 9, comprising storing the dataset in the memory until a combination of the dataset and the one or more further corresponding datasets exceeds a recording size-limit.

12. A method of operating a first device to determine a distance, d, between the first device and a further device, the method comprising:
transmitting a first broadcast frame comprising an identifier of the first device, A, and a transmission timestamp;
receiving a further broadcast frame from the further device, the further broadcast frame comprising
an identifier of the further device, B, and a transmission timestamp of the further device,
and at least one data pair, each data pair comprising a transmitting device identifier, Q, and a reception timestamp, wherein the reception timestamp is indicative of the arrival time at the further device of a prior broadcast frame broadcast from the transmitting device;
determining a reception timestamp of the further broadcast frame;
comparing each transmitting device identifier, Q, with the identifier of the first device, A;
in response to matching a one of the at least one transmitting device identifiers with the identifier of the first device, determining the distance between the first device and the further device;

at the end of a time interval after transmitting the first broadcast frame, transmitting a subsequent broadcast frame, wherein the subsequent broadcast frame comprises
the identifier of the first device, A, and a transmission timestamp, T2TxA,
and at least one data pair,
each data pair comprising a transmitting device identifier, P, and a reception timestamp, wherein the reception timestamp records the arrival time, TRxPA at the first device of a broadcast frame previously broadcast from the transmitting device, and wherein the time interval has a duration between 0.5 and 1.5 times a broadcast interval.

13. A first device having a device identifier, A, and comprising:
a clock-circuit configured to generate one or more timestamps;
an ultra-wideband (UWB) transceiver, configured to:
transmit a first broadcast frame, TxA, comprising the device identifier, A and a first transmission timestamp, TTxA generated by the clock, wherein the first transmission timestamp indicates a first time of departure that corresponds to a first moment when the first device transmitted the first broadcast frame, and
receive, at a second moment, a further broadcast frame, TxB, from a further device, B; and
a processor configured to determine, from the further broadcast frame:
an identifier of the further device, B,
a second transmission timestamp, TTxB, which indicates a second time of departure that corresponds to a third moment when the further device transmitted the further broadcast frame,
a first data pair, which includes the identifier of the first device, A, and a first reception timestamp, TRxAB, which indicates a first time of arrival that corresponds to a fourth moment when the further device received the first broadcast frame,
and a second data pair, which includes an identifier of a third device, C, and a second reception timestamp, TRxCB, which indicates a second time of arrival that corresponds to a fifth moment when the further device received another further broadcast frame;
wherein the processor is further configured to:
determine a third reception timestamp, TRxBA, of the further broadcast frame, wherein the third reception timestamp corresponds to the second moment when the further broadcast frame, TxB, was received;
and, in response to determining, by the first device, that the first data pair includes the identifier of the first device,
determine the distance between the first device and the further device.

14. The first device according to claim 13, further comprising:
a memory configured to store, a dataset associated with the further broadcast frame, TxB, and wherein the dataset includes
the identifier of the further device, B;
the second transmission timestamp of the further device, TTxB, and
the third reception timestamp, TRxBA, of the further broadcast frame.

15. The first device according to claim 14, wherein the memory is configured to store one or more further respective corresponding datasets associated with respective yet further broadcast frames from one or more yet further devices.

16. The first device according to claim 15, wherein the memory is configured to store the dataset for one of: a recording interval, and until a combination of the dataset and the one or more further corresponding datasets exceeds a recording size-limit.

17. The first device according to claim 13, wherein the device identifier is a Media Access Code, MAC, address.

* * * * *